United States Patent [19]

Spitz et al.

[11] 4,094,577
[45] June 13, 1978

[54] HIGH-RESOLUTION, WIDE-FIELD HOLOGRAPHIC LENS

[75] Inventors: Erich Spitz; Guy Bismuth, both of Paris, France

[73] Assignee: Thomson-CSF, Paris, France

[21] Appl. No.: 700,182

[22] Filed: Jun. 28, 1976

Related U.S. Application Data

[63] Continuation of Ser. No. 443,502, Feb. 15, 1974, abandoned, which is a continuation of Ser. No. 240,140. Mar. 31, 1972, abandoned.

[30] Foreign Application Priority Data

Apr. 13, 1971 France ............................ 71.12966

[51] Int. Cl.² .......................... G02B 5/32; G03H 1/04
[52] U.S. Cl. ............................ 350/3.72; 350/162 ZP
[58] Field of Search ............................ 350/3.5, 162 ZP

[56] References Cited

U.S. PATENT DOCUMENTS

| | | | |
|---|---|---|---|
| 3,575,485 | 4/1971 | Van Buskirk | 350/3.5 |
| 3,586,412 | 6/1971 | Leith | 350/3.5 |
| 3,658,403 | 4/1972 | Greenaway et al. | 350/3.5 |
| 3,677,622 | 7/1972 | Nishida et al. | 350/3.5 |
| 3,735,374 | 5/1973 | Rembault | 350/3.5 |

*Primary Examiner*—Ronald J. Stern
*Attorney, Agent, or Firm*—Cushman, Darby & Cushman

[57] ABSTRACT

The present invention relates to holographic lenses.
The wide field holographic lens in accordance with the invention is obtained by the superimposition of interference networks recorded within the volume of a thick material. These networks constitute a corresponding number of thick elementary holographic lenses, each of which satisfactorily covers a specific region of the field; the invention likewise describes a device for constructing said wide field holographic lens.

5 Claims, 7 Drawing Figures

HIGH-RESOLUTION, WIDE-FIELD HOLOGRAPHIC LENS

This is a continuation of application Ser. No. 443,502, filed Feb. 15, 1974, which is a continuation of application Ser. No. 240,140, filed Mar. 31, 1972, both of which are now abandoned.

The present invention relates to a high-resolution, wide-field holographic lens, produced by the superimposition of interference networks recorded within the volume of a thick material.

The production of a conventional high-resolution lens requires that the various reflective or refractive surfaces used are machined with extremely high accuracy. The simultaneous production of a wide field means that these surfaces have to be multiplied in order to reduce the aberrations. The cost of such lenses is thus extremely high both because of the length of the design calculations involved and of the means which have to be implemented in order to produce them.

The invention provides lenses operating with monochromatic light, which have identical performances, in terms of resolution and field, to conventional lenses, whilst at the same time being simpler to design and manufacture and therefore less expensive.

According to the present invention there is provided: a holographic lens for optically conjugating at least one first elementary surface and several second elementary surfaces with aberrations less than a predetermined limiting value and using the angular selection properties caused by Bragg effect of three-dimensional networks, said lens being constituted by a thick plate of photosensitive material having parallel faces, said plate comprising as many superimposed three-dimensional networks made of recorded interference fringes mixed within the volume of said material as there are said second elementary surfaces, each said network constituting a three-dimensional elementary holographic lens, each said elementary lens field of view being restricted by said angular selection properties, each said second elementary surfaces being respectively conjugated with one said first elementary surface by said elementary lens, and said plate thickness restricting each said elementary lens field of view to the value for which said aberrations are at most equal to said limiting value.

For a better understanding of the invention, and to show how the same may be carried into effect, reference will be made to the ensuing description and the attached figures, among which.

Figure 1:
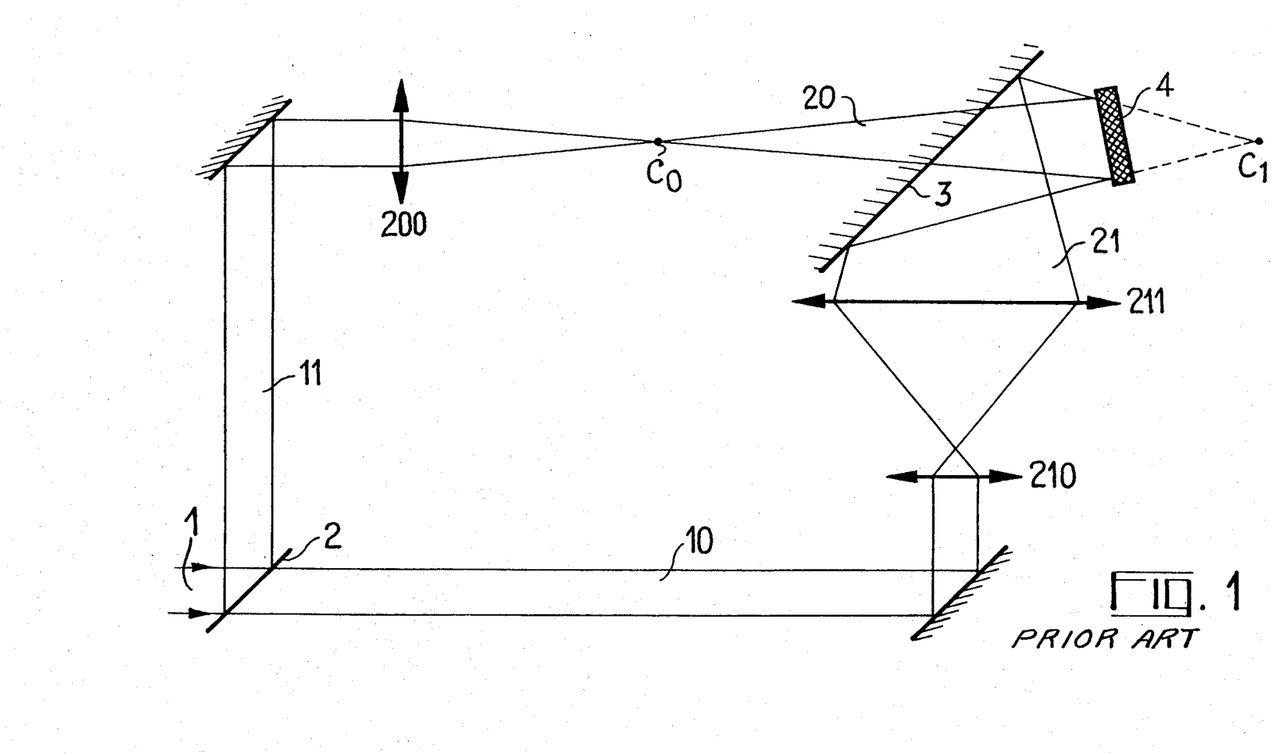
FIG. 1 illustrates a known device utilised for the production of a holographic lens.

In FIG. 1, the diagram of a device used for the production of a conventional convergent holographic lens can be seen. A parallel coherent light beam 1, issuing from a laser source not shown in the Figure, is divided by a light splitter 2 into two parallel beams 10 and 11 from which the lenses 200, 210 and 211 produce two spherical waves, one 20 centered on a point $C_0$, the other 21 centered on a point $C_1$. A semi-reflective plate 3 causes these two waves to interfere with one another. A photosensitive device 4, for example a photographic plate, enables the consequent interference fringes to be recorded.

In the interference region, the position of points corresponding to equal values of light intensity will be a family of ellipsoids of revolution having foci $C_0$ and $C_1$, which, after recording in the photosensitive medium, will produce there a three-dimensional network of semi-transparent mirrors.

If the thickness of the medium does not exceed more than a few wavelengths of the radiation used, the thickness effect will be negligible and the network can be considered as a two-dimensionally zoned network, formed, depending upon the kind of process employed, of concentric rings of variable transparency or variable refractive index, constituting a conventional holographic lens However, the greater the thickness of the photosensitive medium becomes in relation to the wavelength used, the more marked will be the angular selection introduced due to the Bragg effect and resulting from multiple reflections at the series of transparent mirrors thus formed. A thick holographic lens will thus exhibit two important differences vis-a-vis conventional thin holographic lenses. On the one hand, it will not produce three diffracted beams but only one, so that light efficiencies close to 100% can be achieved. On the other hand, its field will be narrower the greater its thickness. In other words, the diffracted beam extinguishes as soon as the point source moves away from the points $C_0$ or $C_1$ which are the centers of the spherical waves which have been used to construct the lens; a thick holographic lens, therefore, will only transmit light in the immediate neighbourhood of the points where the conditions of stigmatism are satisfied.

A thin holographic lens will therefore present a low light efficiency and a wide field but will exhibit considerable aberrations. By increasing its thickness, its light efficiency is increased and its field restricted to the region in which the conditions of stigmatism are satisfied.

The invention exploits these properties of thick holographic lenses to produce a holographic objective lens of high luminous efficiency, with high resolution and a wide field, by superimposing within the body of a thick material a substantial number of elementary lenses each of which concerns a specific area of the field.

Figure 2:
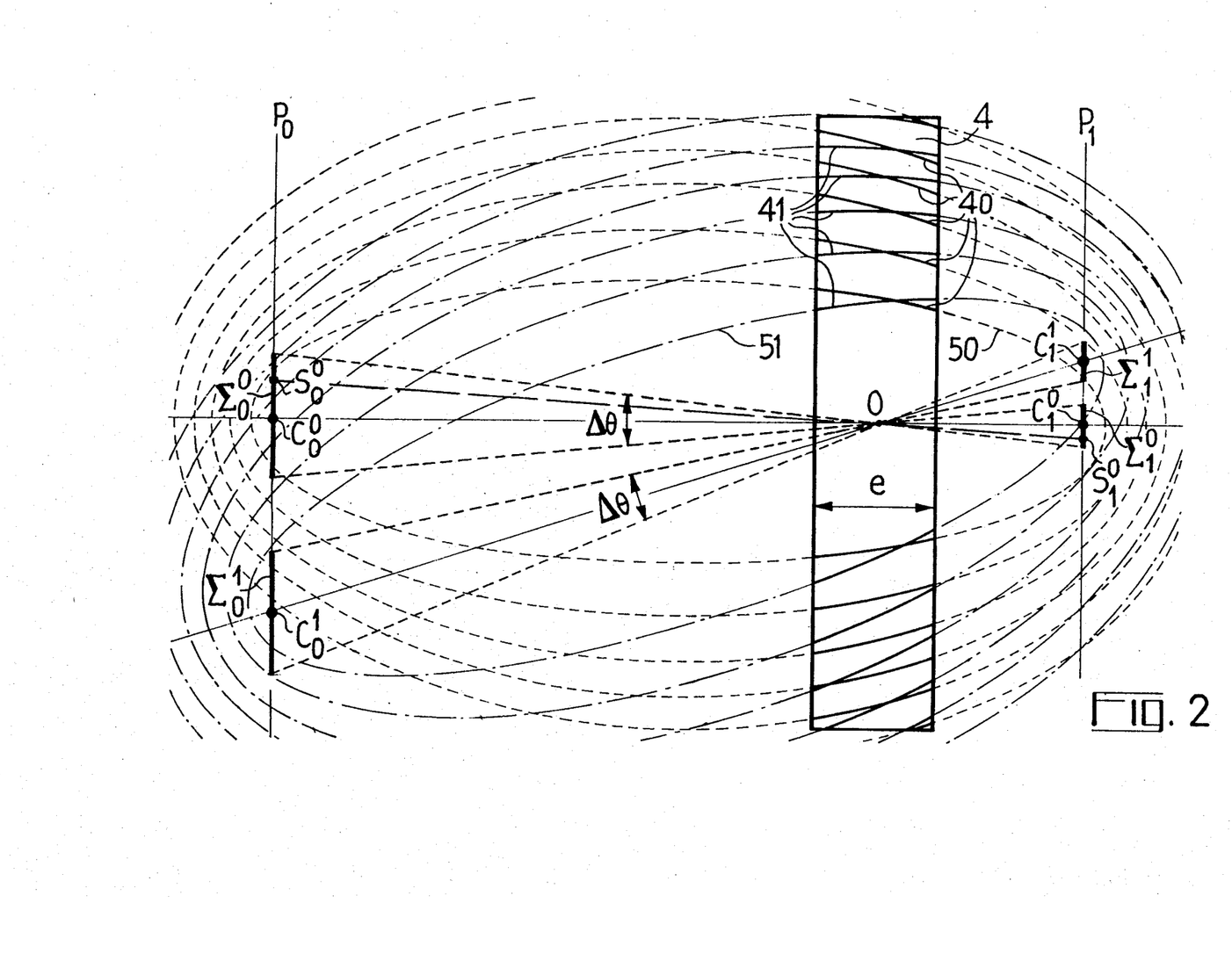
FIG. 2 illustrates the sectional view of a holographic lens in accordance with the invention.

FIG. 2 illustrates a sectional view of a lens in accordance with the invention, in which, in order to facilitate understanding, the number of elementary thick holographic lenses has been set at two. In the medium 4 whose thickness is e, two networks of fringes have been recorded in the form of variations in the real or imaginery part of the index; only locations of maximum variations in index have been shown in the Figure. The first network of fringes 40, constituting the first elementary lens, is formed by the intersections with the medium 4 of a family of ellipsoids of revolution such as those 50, whose foci are $C_0^0$ and $C_1^0$. $C_0^0$ and $C_1^0$ are the centres of the spherical waves whose recorded interferences constitute the network 40; similarly, the second network of fringes 41, constituting the second elementary lens, is formed by a family of ellipsoids of revolution such as those 51, having foci $C_0^1$ and $C_0^1$, where $C_0^1$ and $C_1^1$ are the centres of the spherical waves which were responsible for the recording of the network 41. The points $C_0^0$, $C_0^1$ on the one hand, and $C_1^0$, $C_1^1$ on the other, are respectively located in two planes $P_0$, $P_1$ parallel to the two planes delimiting the photosensitive medium.

The two points $C_0^0$ and $C_0^1$ have been chosen in such a manner that at the time of recording of the network, the angle made between the two directions $OC_0^0$ and $OC_0^1$ (where 0 is the intersection between the median plane of the photosensitive medium, and the straight lines $C_0^0 C_1^0$ or $C_0^1 C_1^1$ is greater than $\Delta\theta$; said value $\Delta\theta$ corresponds to the angular selection effected, by the Bragg effect, through the set of semi-transparent mirrors corresponding to the network fringes recorded in the thick medium; the value of the angle $\Delta\theta$ is inversely proportional to the thickness e of the photosensitive medium.

Under these circumstances, in respect of each source point $S_0^0$ located on a surface $\Sigma_0^0$ delimited by the intersection between the plan $P_0$ and the cone of revolution of axis $OC_0^0$ and apex angle $\Delta\theta$, the lens constituted by the network of fringes 40 will produce an image $S_1^0$ located in the plane $P_1$, such that the point $S_0^0$, 0 and $S_1^0$ are in alignment with one another; the correspondence between the points $S_0^0$ and $S_1^0$ will satisfy the conditions of stigmatism if these points are coincidental with the pair $C_0^0$, $C_1^0$ and will deviate the less the closer the straight line $S_0^0$, $S_1^0$ is to the straight line $C_0^0 C_1^0$. By contrast, the second lens formed by the network 41, unlike the case with a thin holographic lens, will not form any image of said same point $S_0^0$; in other words, the point $S_0$ is outside the Bragg selection zone of the lens 41, this zone being the area $\Sigma_0^1$ delimited by the intersection of the plane $P_0$ with the cone of revolution of apex angle $\theta\Delta$ and axis $OC_0^1$.

If we call $\Sigma_1^0$ the area delimited by the intersection of the plan $P_1$ with the cone of revolution whose axis is $C_0^0$, $OC_1^0$ and whose apex angle is $\Delta\theta$, then it will be seen that the elementary lens formed by the network of fringes 40, under conditions close to stigmatism links the surfaces $\Sigma_0^0$ and $\Sigma_1^0$ to the exclusion of any other point on the planes $P_0$ and $P_1$. Similarly, the elementary lense 41 links the two surfaces $\Sigma_0^1$ and $\Sigma_1^1$.

It is clear that in practice, an objective lens can comprise a large number of elementary lenses such as that 40, each linking pairs of elementary surfaces $\Sigma_0^n$ and $\Sigma_1^n$. The elementary surfaces $\Sigma_0^n$ are arranged adjacent one another to cover the requisite field of the lens.

The number n of elementary lenses making the objective lens is limited only by the maximum variation $\Delta N$ in index which the photosensitive medium is capable of recording. In other words, each elementary lens, in order to present an adequate luminous efficiency, requires an elementary variation in index equal to $\delta N$ which, for the set of n lenses, will mean a total variation in index $\Delta N$, of:

$$\Delta N = n\delta N$$

The recording of the fringes will preferably be effected in the form of variations in the real part of the index of the photosensitive medium (or variations in the refractive index), which enable the objective to attain overall luminous efficiencies close to unity, recording in the form of variations in the imaginery part of the index (or variations in the coefficient of transmission) imposing a limit of some few % only on the overall efficiencies.

By way of a non-limitative example, in order to obtain this recording in the form of variations in refractive index, the conventional bleached gelatin method could be used; a thick photographic emulsion, after exposure and development, is subjected to a chlorination treatment during which the absorptive grains of metallic silver are converted into transparent grains of silver chloride having a different index to that of the surrounding gelatine. The maximum variation $\Delta N$ in the refractive index which can be achieved in the case of a bleached gelatin is in the order of 0.1.

Figure 3:
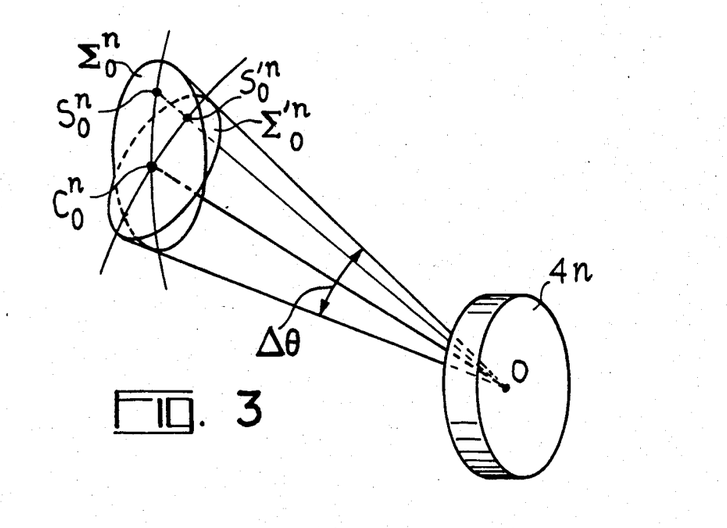
FIG. 3 is an explanatory illustration.

The choice of thickness of the photosensitive medium will be dictated by the separating power which the objective lens is to have. The Bragg angular selection angle $\Delta\theta$, which determines the dimension of the elementary surfaces $\Sigma_0^n$ or $\Sigma_1^n$ corresponding to each elementary lens, varies inversely with the thickness of the medium and the aberrations in respect of each elementary surface should not exceed the limit imposed by the separating power. However, this choice poses a problem to the extent that in the most usual case, the maximum value of the aberrations for an elementary surface $\Sigma_0^n$ centered on a point $C_0^n$, depends upon the position of said point in the field of the lens. In other words, as FIG. 3 shows, for an elementary lens 4 associated with the point $C_0^n$, the positions of the points of minimum aberration define a spherical surface $\Sigma'_0^n$ of radius $OC_0^n$; the aberrations at the point $S_0^n$ on the elementary surface $\Sigma_0^n$ will thus be the greater, compared with those at the corresponding point $S'_0^n$ on the spherical surface $\Sigma'_0^n$, the greater the distance $S_0^n S'_0^n$.

Figure 4:
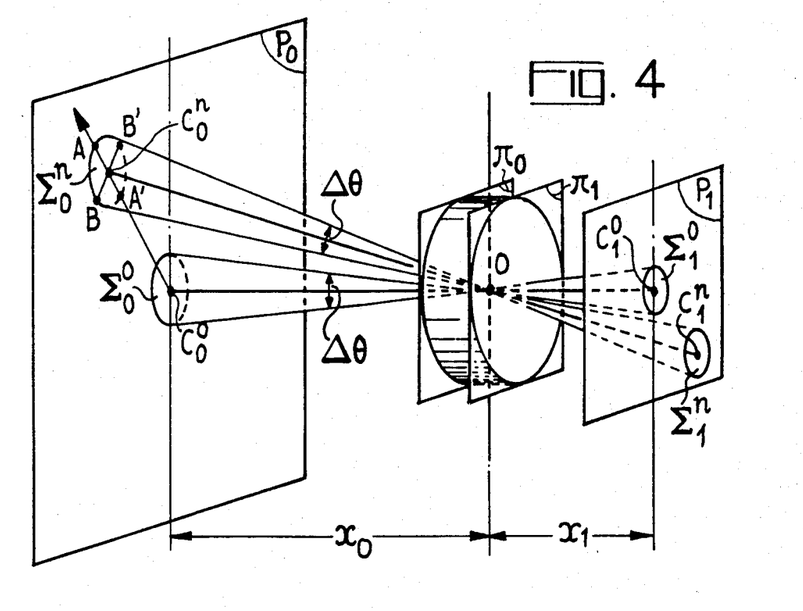
FIGS. 4, 5 and 6 illustrate modes of operation of the lens in accordance with the invention.

Let us, by way of a non limitative example, consider the very frequent case described in FIG. 4, in which it is desired to ensure a quasi-stigmatic correspondence between two parallel planes $P_0$ and $P_1$ by means of a thick holographic lens in accordance with the invention whose photosensitive medium is delimited by two planes $\pi_0$, $\pi_1$ parallel to the foregoing planes; $C_0^0 OC_0^1$ we will take to be the axis of the disc forming the holographic objective lens and the lens field will be assumed to be centered on said axis.

The aberrations at the periphery of the elementary surface $\Sigma_0^n$, centered on the point $C_0^n$, will be the greater in relation to those at the periphery of the surface $\Sigma_0^0$, centered at $C_0^0$, the greater the distance $C_0^0 C_0^n$; in addition, as far as $\Sigma_0^n$ is concerned, the aberrations will increase more rapidly as one moves away from $C_0^n$, where they are zero, towards the points A and A' located upon the axis $C_0^0 C_0^n$, than they will in moving away towards the points B or B' located on the perpendicular to the said axis.

Thus, it is essential to chose the angle $\theta$ so that the elementary surfaces located at the periphery of the field are sufficiently small for the aberrations there not to exceed the limit fixed by the definitions the objective lens is to have. However in order to reduce the number of elementary lenses, it is advantageous to select $\Delta\theta$ as a function of the radius imposed by the aberrations on the central elementary surface $\Sigma_0^0$. Accordingly, the procedure will be such that the other elementary surfaces partially overlap one another so that with every point in the field there is associated at least one elementary lense wich produces of said point an image having the desired resolution.

By way of an example, it is possible in accordance with the invention to produce a convergent objective lens producing a magnification (or reduction) by a factor 10, which has the following characteristics:

object distance: $x_o = 100$ mm
image distance: $x_1 = 10$ mm
dimension of object field: $\phi_o = 5$ cm dimension of image field: $\phi_1 = 5$ mm
aperture: $f/8$
wavelength: $\lambda = 6328$ A
efficiency: 0.5
separating power at the image side: 200 lines per mm with a contrast of 10%.

The separating power of the objective lens is thus diffraction limited. The photosensitive medium will be a bleached gelatin 400 μm thick, making it possible to record variations in refractive index of 0.1. The objective lense will be made up of 181 elementary lenses produced by 181 successive exposures of the photosensitive medium. As FIG. 4 shows, the centers $C_0^n$, $C_1^n$ of the two coherent spherical waves used for the recording of each elementary lens ($n$ varying from $n = 0$ to $n = 180°$) describe two parallel planes $P_0$, $P_1$ such that:

$$OC_0^0 = x_0 = 10 \text{ cm}$$

$$OC_1^0 = x_1 = 10 \text{ mm}$$

The axis of the system is the axis of revolution $C_0^0 C_1^0$. The points $C_0^n$ $C_1^n$ are distributed on two series of $i$ concentric circles respectively centered on $C_0^0$ and $C_1^0$ and defined by the angle $u_i$ which is made between the axis $C_0^{ni} C_1^{ni}$ and the axis $C_0^0 C_1^0$; on each circle there are $P_i$ points $C_0^{ni}$ or $C_1^{ni}$, dividing it into $P_i$ equal parts. The following table gives the corresponding values of $u_i$ and $P_i$ for each value of $i$:

| i     | 0 | 1    | 2     | 3     | 4    | 5    | 6     | 7     | 8     | 9     | 10 |
|-------|---|------|-------|-------|------|------|-------|-------|-------|-------|----|
| $u_i$ | 0 | 2.7° | 4.65° | 7.10° | 8.3° | 9.5° | 10.6° | 11.6° | 12.6° | 12.6° |    |
| $P_i$ | 1 | 6    | 6     | 6     | 18   | 18   | 20    | 22    | 24    | 28    | 30 |
|       |   |      |       |       |      | 7    |       |       |       |       |    |

The invention, although more particulary described in the context of a convergent objective lens, relates equally to divergent objective lenses. In the latter case, the two planes $P_0$ and $P_1$ of FIG. 4 will then no longer be located at either side of the photosensitive film but both at the same side instead.

Figure 5:
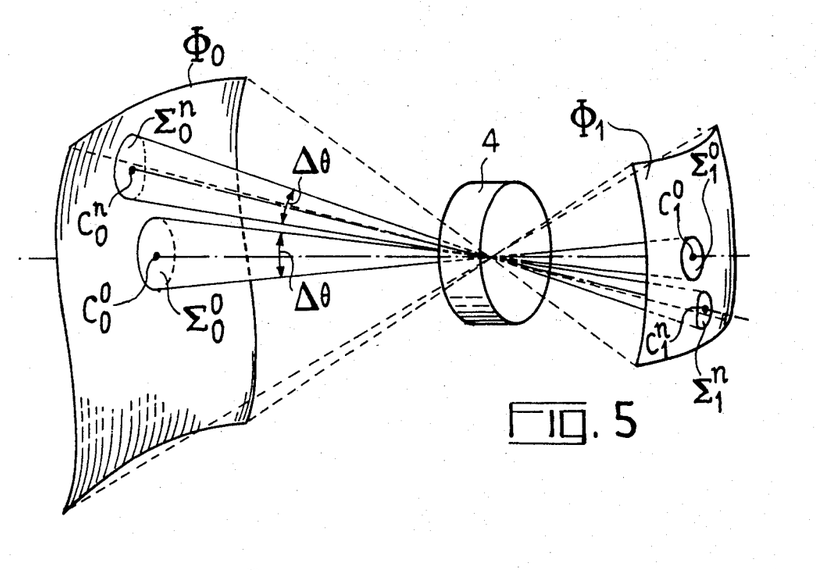

FIG. 5 indicates a not inconsiderable advantage of the objective lenses in accordance with the invention, which advantage is not exhibited by conventional lenses, namely of not merely linking two planes such as $P_0$ and $P_1$ but, if required, two arbitrary surfaces $\phi_0$ and $\phi_1$; as FIG. 5 shows, the surfaces $\phi_0$ and $\phi_1$ are then divided into as many pairs of elementary surfaces $\Sigma_0^0$ and $\Sigma_1^0$, ..., $\Sigma_0^n$ and $\Sigma_1^n$, as required, with which pairs there correspond as many elementary lenses; the centres of the two coherent spherical waves used for the recordinf of said elementary lenses, will then be located successively at the points $C_0^0$ and $C_1^0$, ..., $C_0^n$ and $C_1^n$ of the surfaces $\phi_0$ and $\phi_1$.

Figure 6:
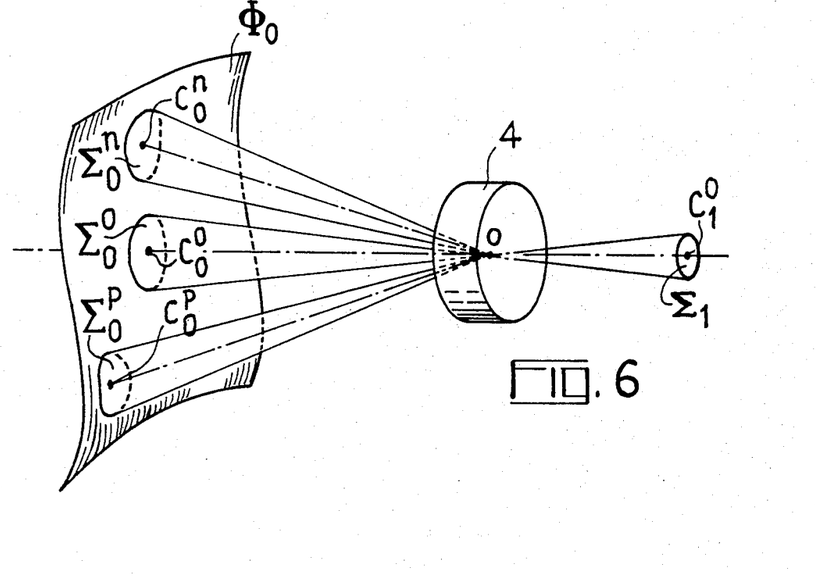

As FIG. 6 shows, the objective lens in accordance with the invention can also, through the agency of $n$ elementary surimposed lenses, link a single elementary surface $\Sigma_1$, which may be the sensitive surface of a radiation detector or the emissive surface of a radiation source, with $n$ elementary surfaces $\Sigma_0^0$ ... $\Sigma_0^p$ ... $\Sigma_0^n$ belonging to the surface $\phi_0$ and possibly arranged adjacent one another in order to form said surface; the elementary surface $\Sigma_1$ is defined by the cone of apex angle $\Delta\theta$ corresponding to the selection angle resulting, in the thick medium, from the Bragg effect. In this case, one of the spherical waves used for recording and centered at $C_1$, remains fixed in relation to the photosensitive medium whilst the centre of the other successively occupies the positions $C_0^0$, ... $C_0^n$ on the surface $\phi_0$. This kind of objective lense can be used to concentrate, on a single detector, the radiation coming from a plurality of sources or from an extensive surface; it can also be used to form a plurality of image sources from a single radiation source.

When illuminated with polychromatic light, these various kinds of objective lenses will only transmit a narrow spectral band centered on the wavelength of the laser spectrum line utilised in their manufacture. They can therefore be used as narrow-band filters.

Figure 7:
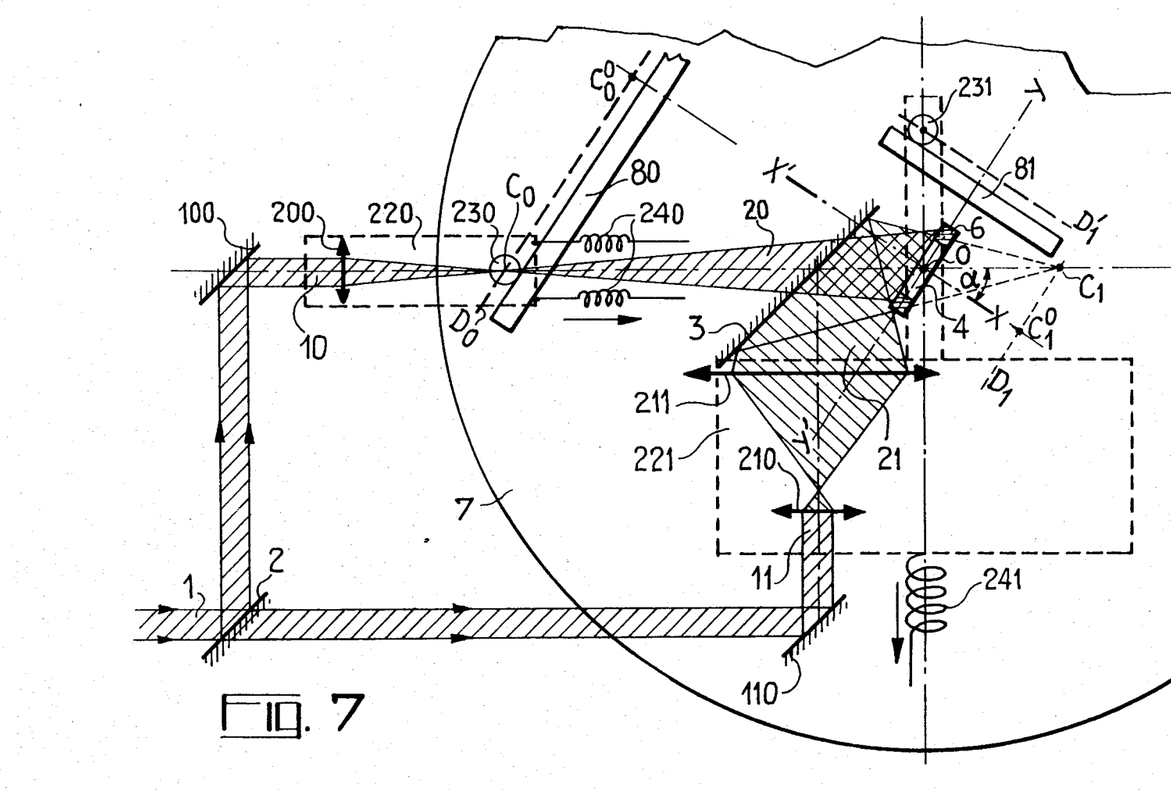
FIG. 7 illustrates an example of a device for producing a lens in accordance with the invention.

FIG. 7 describes a non-limitative example of a device in accordance with the invention, which makes it possible to produce a holographic objective lens by the superimposition of interference networks recorded in a thick medium. The variant embodiment shown in the Figure relates more especially to the design of a convergent objective lens, linking two parallel planes, as described in FIG. 4. A parallel beam 1 of coherent light issuing from a laser source which has not be shown in the Figure, is split by a light splitter 2 into two horizontal beams which, deflected by the flat mirrors 100 and 110, produce two horizontal, perpendicular beams 10 and 11. From these two beams an optical device which comprises on the one hand the objective lens 200 and on the other the objective lenses 210 and 211, as well as the semi-reflective plate 3, produces a region of interference between two spherical waves 20 and 21 respectively centered at the points $C_0$ and $C_1$. A disc of photosensitive material 4 records within its volume the interference fringes thus produced.

The disc 4 is arranged upon a concentric alidade 6 located in a vertical plane, enabling it to rotate about a horizontal axis XOX' passing through its centre 0. Said alidade is itself fixed to the plate 7 of a goniometer which enables the disc to be orientated about a vertical axis perpendicular to the plane of the Figure and passing through 0. Also arranged on the plate 7 are two scales 80 and 81, perpendicular to one another; a device which has not been shown in the Figure enables the scale 80 to be translated parallel to itself in the direction XOX' and an identical device enables the scale 81 to be translated likewise in the direction YOY'.

The objective lenses 200 on the one hand and those 210 and 211 on the other, are respectively arranged on carriages 220 and 221 mobile on the bed of the optical arrangement and fixed to two rollers 230 and 231 which roll on the carefully aligned faces of the scales 80 and 81; return springs 240, 241 maintain the rollers in contact with the scales. The carriages displace on the direction of the beams 10 and 11.

When the plate 7 and consequently the disc 4 are rotated the axis of the roller 230 describes a straight line $D_0$ prependicular to XOX' and at a distance $X_0$ from the vertical axis passing through the point 0; similarly, the axis of the roller 231 describes the straight line $D'_1$ on the plate 7, perpendicular to the axis YOY' and at a distance $X_1$ from the vertical axis passing through 0. The objective lens 200 is arranged upon the carriage 220 in such a fashion that its focus $C_0$ coincides with the axis of the roller 230. When the photosensitive disc 4, driven by the plate 7, rotates about a vertical axis passing through its centre 0, the point $C_0$ describes in relation to the plate 7 a straight line $D_0$ parallel to the plane of the disc and at a variable distance $X_0$ from the point 0. Similarly, appropriate positioning of the objective lense 211 on the carriage 221 enables the point $C_1$ to be constrained to describe the straight line $D_1$ likewise parallel to the plane of the disc and at the variable distance $x_1$ from the point 0; the straight line $D_1$ is derived from the straight line $D'_1$ by a rotation through 90° about the vertical axis passing through 0.

The device in accordance with the invention thus makes it possible, without the need to displace the laser beams 1, 10 and 11, to constrain the centers $C_0$ and $C_1$ of the spherical waves used for the recording of the elementary lenses which make up the objective lens to describe, within a reference system associated with the disc 4, two planes $P_0$, $P_1$ perpendicular to the axis XOX' of said disc. If we call $\alpha$ to the angle made by the axis XOX' with the direction of the beam 10 and $C_0^0$ and $C_1^0$ the intersections between the axis XOX' and the straight lines $D_0$ and $D_1$, then it will be seen that any rotation of the alidade 6 causes the points $C_0$ and $C_1$ to describe concentric circles in the planes $P_0$ and $P_1$, which circles are respectively centered at $C_0^0$ and $C_1^0$ and are of respective radii $x_o$ tan $\alpha$ and $x_1$ tan $\alpha$. The magnification of the lens, given by the ratio of the distances $x_0$ and $x_1$, is obtained from the positioning of the scales 80 and 81. As stated hereinbefore, as many successive exposures are carried out as the objective lens is to contain elementary lenses, by displacing the points $C_0$ and $C_1$ on concentric circles by means of the alidade 6, the radii of said circles being successively modified by adjustment of the angle $\alpha$ through the plate 7.

The device in accordance whith the invention lends itself equally well to the production of a divergent objective lens. To do this, it is merely necessary to replace the objective lenses 210 and 211 by a lens similar to that 200, to arrange the scale 81 in a position symmetrical vis-a-vis the point 0, to that shown in FIG. 6, and to modify the position of the return spring 214.

The device in accordance with the invention also makes it possible to produce an objective lens which instead of linking two planes, links two arbitrary surfaces of revolution in relation to the axis of the lense, this by replacing the scale 80 and 81 by cams of suitable profiles; these two cams will cause the points $C_0$ and $C_1$ to describe, in a plane associated with the plate 7, two curves which are symmetrical in relation to the axis $C_0^0$ $C_1^0$ and are such that by rotation about this axis, they respectively trace the two surfaces of revolution which are the object and image surfaces. The profiles of the cams will therefore have to be two curves parallel two the curves thus defined and respectively spaced away from said curves by distances equal to the radii of the rollers 230 and 231.

What we claim is:

1. Holographic lens for optically conjugating a plurality of first elementary surfaces and an equal number of second elementary surfaces with aberrations less than a predetermined limiting value using the angular selection properties caused by Bragg effect of 3-dimensional network;

said lens being constituted by a thick plate of photosensitive material having parallel faces;

said plate comprising as many superimposed 3-dimensional networks made of recorded interference fringes mixed within the volume of said material as there are said first elementary surfaces;

each said network constituting a 3-dimensional holographic elementary lens, each said elementary lens field of view bieng restricted by said angular selection properties;

each said holographic elementary lens respectively conjugating a single said first elementary surface and a single said second elementary surface;

the respective centers of said first elementary surface, said second elementary surface and said holographic lens being substantially aligned along a straight line; and said plate thickness restricting each said elementary lens field of view to the value for which said aberrations are at most equal to said limiting value.

2. Holographic lens as claimed in claim 1, wherein said first and second elementary surfaces are respectively arranged side by side to cover two arbitrary surfaces.

3. Holographic lens as claimed in claim 1, wherein said superimposed three-dimensional networks of interference fringes are recorded within the volume of said photosensitive material in the form of variations in the refractive index of said material.

4. Holographic lens as claimed in claim 1, wherein said superimposed three-dimensional networks of interference fringes are recorded within the volume of said photosensitive material in the form of variations in transparency of said material.

5. Optical system for constructing a holographic lens optically conjugating first elementary surfaces and second elementary surfaces with aberrations less than a predetermined limiting value and using the angular selection properties caused by Bragg effect of three-dimensional networks; said first and second surfaces being arranged side by side to cover two surfaces of revolution respectively generated by first and second curves revolving around their axes of symmetry, said lens being constituted by a thick plate of photosensitive material having parallel faces; said plate comprising as many superimposed three-dimensional networks made of recorded interference fringes mixed within the volume of said material as there are said second elementary surfaces; each said network constituting a three-dimensional holographic elementary lens, each said elementary lens field of view being restricted by said angular selection properties; each said second elementary surfaces being respectively conjugated with said first elementary surfaces by said elementary lens; the respective centers of one of said first elementary surfaces, one of said second elementary surfaces, and said conjugating elementary lens being substantially aligned with one another; and said plate thickness restricting each said elementary lens field of view to the value for which said aberrations are at most equal to said limiting value, said optical system comprising:

a coherent radiation source;

optical means for forming from said source two beams, said beams having their revolution axes coplanar and perpendicular to each other;

translating means for respectively translating said beams along their revolution axes;

semi-transparent reflecting means positioned at the intersection of said beams to provide a reflected and a transmitted beam, said transmitted and reflected beams having a common revolution axis and exhibiting an interference region covering said thick plate;

a first and a second orientating device for orientating said thick plate respectively around a first and a second axis of rotation, said first axis of rotation being located in said thick plate and parallel to said parallel faces and said second axis of rotation being perpendicular to said thick plate;

said first orientation device including a goniometric plate, said goniometric plate rotating around said first axis of rotation and supporting said second orientating device and two cams;

said two cams having profiles respectively parallel to said curves; said axes of symmetry of said curves being parallel to said goniometric plate and respectively parallel and perpendicular to said parallel faces of said thick plate and intersecting at the center of said plate;

and said cams controlling said translating means.

* * * * *